United States Patent
Khaleel et al.

(10) Patent No.: US 12,281,052 B2
(45) Date of Patent: Apr. 22, 2025

(54) ACIDIFIED NP, PK, NPK FERTILIZER GRANULES FOR FERTIGATION

(71) Applicant: SABIC AGRI-NUTRIENTS COMPANY, Jubail (SA)

(72) Inventors: Mohamed Akasha M. Khaleel, Riyadh (SA); Hatim Dekhiel Aldekhiel, Riyadh (SA)

(73) Assignee: SABIC AGRI-NUTRIENTS COMPANY, Jubail (SA)

( * ) Notice: Subject to any disclaimer, the term of this patent is extended or adjusted under 35 U.S.C. 154(b) by 892 days.

(21) Appl. No.: 17/312,206

(22) PCT Filed: Dec. 11, 2019

(86) PCT No.: PCT/IB2019/060671
§ 371 (c)(1),
(2) Date: Jun. 9, 2021

(87) PCT Pub. No.: WO2020/121222
PCT Pub. Date: Jun. 18, 2020

(65) Prior Publication Data
US 2022/0048832 A1 Feb. 17, 2022

Related U.S. Application Data

(60) Provisional application No. 62/777,923, filed on Dec. 11, 2018.

(51) Int. Cl.
*C05G 3/60* (2020.01)
*A01C 21/00* (2006.01)
(Continued)

(52) U.S. Cl.
CPC ............... *C05G 3/60* (2020.02); *A01C 21/00* (2013.01); *C05B 17/00* (2013.01); *C05C 3/005* (2013.01);
(Continued)

(58) Field of Classification Search
CPC .... C05G 3/60; C05G 1/00; C05G 5/12; A01C 21/00; C05B 17/00; C05C 3/005; C05D 1/005; C05D 9/02; C05D 1/02
See application file for complete search history.

(56) References Cited

U.S. PATENT DOCUMENTS 2,722,456 A  11/1955 Glessner
2,909,002 A  10/1959 Hendry
(Continued)

FOREIGN PATENT DOCUMENTS

AU  2006207855  3/2007
AU  2018201274  3/2018
(Continued)

OTHER PUBLICATIONS

"Poly-Feed pHast—Soluble NPK Fertilizers with low pH," Haifa Group, https://www.haifa-group.com/poly-feed%E2%84%A2-phast, Date Accessed: Sep. 2, 2020.
(Continued)

*Primary Examiner* — Jennifer A Smith
(74) *Attorney, Agent, or Firm* — Norton Rose Fulbright US LLP (57) ABSTRACT

Solid acidic fertilizer granules, methods for producing the same, and methods for their use in fertigation, are disclosed. The solid acidic fertilizer granules include a plant nutrient and one or more inorganic acid distributed throughout the granules. The amount of the inorganic acid is sufficient to adjust the pH value of the fertigation solution containing the dissolved fertilizer granule to an acidic pH and prevent or reduce the precipitation of calcium in the fertigation solution.

20 Claims, 3 Drawing Sheets

(51) Int. Cl.
  *C05B 17/00* (2006.01)
  *C05C 3/00* (2006.01)
  *C05D 1/00* (2006.01)
  *C05D 9/02* (2006.01)
  *C05G 1/00* (2006.01)
  *C05G 5/12* (2020.01)

(52) U.S. Cl.
  CPC ............. *C05D 1/005* (2013.01); *C05D 9/02* (2013.01); *C05G 1/00* (2013.01); *C05G 5/12* (2020.02)

(56) References Cited

U.S. PATENT DOCUMENTS

| | | |
|---|---|---|
| 3,223,518 A | 12/1965 | Hansen |
| 3,313,615 A | 4/1967 | Formaini |
| 3,392,007 A | 7/1968 | Hopewell et al. |
| 3,419,379 A | 12/1968 | Goodale et al. |
| 3,580,715 A | 5/1971 | Dilday |
| 3,666,523 A | 5/1972 | Nau |
| 3,697,245 A | 10/1972 | Dilday |
| 3,938,469 A | 2/1976 | Nau |
| 4,042,366 A | 8/1977 | Fersch et al. |
| 4,594,090 A | 6/1986 | Johnson |
| 4,723,710 A | 2/1988 | Lucore, II |
| 4,917,304 A | 4/1990 | Mazzei et al. |
| 5,152,821 A | 10/1992 | Walter |
| 5,851,260 A | 12/1998 | Aijala et al. |
| 5,917,110 A | 6/1999 | Kust |
| 6,029,904 A | 2/2000 | Taylor |
| 6,030,659 A | 2/2000 | Whitehurst et al. |
| 6,159,263 A | 12/2000 | Greer et al. |
| 6,413,291 B1 | 7/2002 | Wommack et al. |
| 7,393,885 B2 | 7/2008 | Kiyokawa et al. |
| 8,506,670 B2 | 8/2013 | Varadachari |
| 8,721,758 B1 | 5/2014 | Miller et al. |
| 9,004,374 B1 | 4/2015 | Gans |
| 9,073,795 B2 | 7/2015 | Bergevin et al. |
| 9,199,883 B2 | 12/2015 | Peacock et al. |
| 9,439,345 B1 | 9/2016 | Miller et al. |
| 9,487,452 B2 | 11/2016 | Ledoux |
| 9,586,869 B1 | 3/2017 | Burnham et al. |
| 9,688,586 B1 | 6/2017 | Roa-Espinosa et al. |
| 9,856,179 B2 | 1/2018 | Miller et al. |
| 11,155,503 B2 | 10/2021 | Sharma |
| 2002/0186614 A1 | 12/2002 | Millward |
| 2005/0144997 A1* | 7/2005 | Phillips .............. C05G 5/40 71/28 |
| 2006/0254331 A1 | 11/2006 | Burnham |
| 2007/0131009 A1 | 6/2007 | Westbrook et al. |
| 2009/0145190 A1 | 6/2009 | Persinger |
| 2010/0273885 A1 | 10/2010 | Davis |
| 2010/0291230 A1 | 11/2010 | Assaraf et al. |
| 2011/0079062 A1 | 4/2011 | Smith |
| 2012/0067094 A1 | 3/2012 | Pursell |
| 2014/0238514 A1 | 8/2014 | Yarbrough et al. |
| 2014/0352376 A1 | 12/2014 | Carpenter |
| 2015/0027042 A1 | 1/2015 | Goodwin et al. |
| 2015/0210604 A1 | 7/2015 | Ledoux |
| 2015/0239790 A1 | 8/2015 | Iwig et al. |
| 2016/0060460 A1 | 3/2016 | Welch |
| 2016/0073578 A1 | 3/2016 | Khaleel |
| 2016/0075607 A1 | 3/2016 | Aqel et al. |
| 2016/0229763 A1 | 8/2016 | Wheeler et al. |
| 2016/0318820 A1 | 11/2016 | Deb |
| 2017/0044078 A1 | 2/2017 | McLaughlin et al. |
| 2017/0066692 A1 | 3/2017 | Ledoux |
| 2017/0066693 A1 | 3/2017 | Ledoux |
| 2018/0222810 A1 | 8/2018 | Schumski |
| 2018/0370864 A1 | 12/2018 | Ledoux |
| 2019/0194084 A1 | 6/2019 | Khaleel |
| 2019/0225557 A1 | 7/2019 | Colpaert et al. |
| 2019/0382321 A1 | 12/2019 | Garnier et al. |
| 2020/0131098 A1 | 4/2020 | Hedge et al. |

FOREIGN PATENT DOCUMENTS

| | | |
|---|---|---|
| CA | 2995400 | 2/2017 |
| CH | 497353 A | 10/1970 |
| CH | 425702 A | 12/1996 |
| CN | 1292367 | 4/2001 |
| CN | 1403418 | 3/2003 |
| CN | 1609072 | 4/2005 |
| CN | 1830919 | 9/2006 |
| CN | 1875688 | 12/2006 |
| CN | 100407898 | 12/2006 |
| CN | 101077844 | 11/2007 |
| CN | 101503330 | 8/2009 |
| CN | 201773293 | 3/2011 |
| CN | 102372523 | 3/2012 |
| CN | 102515905 | 6/2012 |
| CN | 102775217 | 11/2012 |
| CN | 102432403 | 7/2013 |
| CN | 103848683 | 6/2014 |
| CN | 104130043 | 11/2014 |
| CN | 104557337 | 4/2015 |
| CN | 105143150 | 12/2015 |
| CN | 105367235 | 3/2016 |
| CN | 105473534 | 4/2016 |
| CN | 105819943 | 8/2016 |
| CN | 105949010 | 9/2016 |
| CN | 106116854 | 11/2016 |
| CN | 106187503 | 12/2016 |
| CN | 106187549 | 12/2016 |
| CN | 206375831 | 8/2017 |
| CN | 108137429 | 6/2018 |
| CN | 108191491 | 6/2018 |
| CN | 109641813 | 4/2019 |
| CN | 106414373 | 6/2020 |
| DE | 102009026234 | 2/2011 |
| EP | 0949221 | 10/1999 |
| EP | 1080054 | 12/2003 |
| EP | 1473992 | 11/2004 |
| EP | 1486477 | 12/2004 |
| EP | 1770079 | 4/2007 |
| EP | 3330241 | 6/2018 |
| FR | 2682554 | 4/1993 |
| FR | 2686861 | 8/1993 |
| GB | 954423 | 4/1964 |
| JP | 2002316888 | 10/2002 |
| RU | 2010024 C1 | 3/1994 |
| RU | 2412140 | 2/2011 |
| WO | WO 1993/010062 | 5/1993 |
| WO | WO 1999/015480 | 4/1999 |
| WO | WO 2001/025168 | 4/2001 |
| WO | WO 2012/064730 | 5/2012 |
| WO | WO 2014/033160 | 3/2014 |
| WO | WO 2014/177932 | 11/2014 |
| WO | WO 2015/001391 | 1/2015 |
| WO | WO 2015/132258 | 9/2015 |
| WO | WO 2016/030584 | 3/2016 |
| WO | WO 2017/013572 | 1/2017 |
| WO | WO 2017/081183 | 5/2017 |
| WO | WO 2017/198693 | 11/2017 |
| WO | WO 2018/042312 | 3/2018 |
| WO | WO 2018/211448 | 11/2018 |
| WO | WO 2020/000022 | 1/2020 |
| WO | WO 2020/104914 | 5/2020 |
| WO | WO 2020/121222 | 6/2020 |

OTHER PUBLICATIONS

"Production of NPK Fertilizers by the Mixed Acid Route," *European Fertilizer Manufactures Association*, 2000, Booklet No. 8, 1-36.

Brown, Brad et al. "Nutrient Management for Field Corn Silage and Grain in the Inland Pacific Northwest". University of Idaho. PNW 615 (Feb. 2010) (Year: 2010).

Burt, "Chemicals for Fertigation," Proc Intl. Irrigation Show: IA's 19th Annual Conference, 1998, 8 pages.

Chemical Book. "Sulfuric acid" https://www.chemicalbook.com/ChemicalProductProperty_EN_CB9675634.htm Jan. 16, 1998.

(56) References Cited

OTHER PUBLICATIONS

Crop Nutrition. "Monoammonium Phosphate (MAP)" https://www.cropnutrition.com/resource-library/monoammonium-phosphate-map Sep. 21, 2020.

Database WPI; Week 200311 Thomson Scientific, London, GB; AN 2003-116042.

House, "Phosphorus, Arsenic, Antimony, and Bismuth," *Inorganic Chemistry*, 2013, 2:493.

International Search Report and Written Opinion issued in International Patent Application No. PCT/IB2018/053475, dated Aug. 1, 2018.

International Search Report and Written Opinion issued in International Patent Application No. PCT/IB2017/055158, dated Nov. 24, 2017.

International Search Report and Written Opinion issued in International Patent Application No. PCT/IB2019/060671, dated Mar. 10, 2020.

International Search Report and Written Opinion issued in International Patent Application No. PCT/IB2014/001392, dated Dec. 10, 2014.

Mosaic, "MicroEssentials SZ" MSDS Revised, dated Dec. 21, 2012.

Office Action issued in corresponding Chinese Application No. 201480023254.3, dated Nov. 1, 2017.

Office Action issued in corresponding Chinese Patent Application No. 2017800529356, dated Mar. 2, 2021.

Office Action issued in corresponding European Patent Application No. 14759270.3, dated May 3, 2018.

Office Action issued in corresponding European Patent Application No. 14759270.3, dated Nov. 24, 2017.

Office Action issued in corresponding GCC Patent Application No. 2017-33903, dated Nov. 8, 2020.

"Monoammonium PHosphate (MAP)." Crop Nutrition, Sep. 21, 2020, https://www.cropnutrition.com/resource-library/monoammonium-phosphate-map.

"NPK Fertilizers—Mixed Acid Route." Lecture Book from NPTEL programme, https://nptel.ac.in/courses/103/107/103107086/. Accessed Jun. 16, 2021, 9 pages.

Office Action issued in U.S. Appl. No. 17/479,183, dated Jun. 29, 2023.

"Sulfuric Acid." Chemical Book, Jan. 16, 1998, https://www.chemicalbook.com/ChemicalProductProperty_EN_CB9675634.hlm.

International Search Report and Written Opinion issued in International Patent Application No. PCT/IB2019/059888, dated Feb. 20, 2020.

International Search Report and Written Opinion issued in International Patent Application No. PCT/IB2021/061966, dated Mar. 17, 2022.

The Berkey "What Is The pH Level Of Water? For Tap, Pure, And Filtered Drinking Water". <https://theberkey.com/blogs/water-filter/why-ph-level-in-your-water-matters> Feb. 22, 2020 (Year: 2020).

Vitosh, M. L. NPK fertilizers. Cooperative Extension Service, Michigan State University, 1990. (Year: 1990).

Office Action issued in corresponding Chinese Patent Application No. 201880043376.7, dated Aug. 27, 2021.

Office Action Search Report issued in corresponding Chinese Patent Application No. 201880043376.7, dated Aug. 17, 2021.

Communication pursuant to Article 94(3) EPC issued in corresponding European Application No. 19824011.1, dated Jan. 2, 2024.

Kant, S. et al. "Fertigation", Reference Module in Earth Systems and Environmental Sciences, 2013.

Office Action Search Report issued in corresponding U.S. Appl. No. 17/295,096, dated Jan. 3, 2024.

International Search Report and Written Opinion issued in corresponding PCT Application No. PCT/IB2021/056304, mailed Oct. 6, 2021.

\* cited by examiner

ACIDIFIED NP, PK, NPK FERTILIZER GRANULES FOR FERTIGATION

CROSS REFERENCE TO RELATED PATENT APPLICATIONS

This application is a national phase application under 35 U.S.C. § 371 of International Application No. PCT/IB2019/060671, filed Dec. 11, 2019, which claims priority to and the benefit of U.S. Provisional Application No. 62/777,923, filed Dec. 11, 2018, the entire contents of each of which are is hereby incorporated into the present application in their entirety.

BACKGROUND OF THE INVENTION

A. Field of the Invention

The invention generally concerns an acidified fertilizer. More specifically, the acidified fertilizer includes an inorganic acid distributed throughout the bulk of a phosphorous containing solid fertilizer granule. The inorganic acid can improve the solubility of the fertilizer granule in irrigation water by reducing the formation of calcium phosphate from the phosphorus in the solid fertilizer granule and calcium present in the irrigation water.

B. Description of Related Art

Soil nutrients, such as nitrogen, phosphorus, potassium, and sulfur, as well as trace elements such as iron, zinc, copper, and magnesium, are useful for achieving thriving agriculture and growth of plants. Upon repeated planting cycles, the quantity of these nutrients in the soil may be depleted, resulting in inhibited plant growth and decreased production. To counter this effect, fertilizers have been developed to help replace the depleted vital nutrients and to create the right balance of nutrients.

Conventionally, fertilizers can be distributed in the soil by the drop-fertilizing method which applies fertilizer granules or powder directly into the soil. By comparison, fertigation, a method widely employed in commercial agriculture and horticulture, applies fertilizer through the irrigation system by dissolving fertilizers directly in the irrigation system. Advantages of fertigation include increased nutrient absorption by plants, accurate placement of nutrients, reduction of fertilizer consumption, reduction of soil erosion, and reduction of energy needed for applying the solid fertilizers. However, most conventional NP (nitrogen-phosphorus), PK (phosphorus-potassium), and NPK (nitrogen-phosphorus-potassium) fertilizers do not fully dissolve in irrigation water with high pH values (pH>7.5) and/or more than 50 ppm calcium content. The phosphorus of the fertilizer can react with the calcium in the water to form an insoluble calcium phosphate complex under high pH conditions. This reduced solubility can result in uneven distribution of the fertilizer in the water. Further, the formation of insoluble calcium phosphate complexes can result in particulate buildup in the irrigation system, which can lead to clogging and ultimately reduced effectiveness or failure of the system to deliver the water to the soil or plants.

Several methods have been developed to improve the solubility of conventional fertilizers in high-pH irrigation water. U.S. Publication No. 2016/0073578 A1 discloses a method for fertigation that includes adding an acidic fertilizer-dissolving agent, including inorganic acids, into water, and then dissolving fertilizer in the water. However, this method requires a step of mixing the water with acid, which may increase the operational cost.

Furthermore, direct handling of concentrated inorganic acid including sulfuric acid, hydrochloric acid, nitric acid, or phosphoric acid, can increase safety concerns. Moreover, the reaction of the inorganic acid with the plant nutrient in irrigation water may result in the need for re-determination of the final nutrient ratios in the fertigation solution, increasing the operational cost and time required to prepare a proper fertigation solution.

PCT application No. WO 2018/042312, Japanese Publication No. 2002/316888A, and CA 2995400 each disclose granular fertilizer compositions that include a fertilizer core and an outer coating that contains an inorganic acid. However, high concentrations of inorganic acid on the outer surface of the granular fertilizer can result in absorption of atmospheric water, can increase the safety concerns of handling these granules, and can increase the cost and complexity of keeping these fertilizer granules dry when they are in storage.

Overall, while fertigation compositions exist, the need for improvements in this field persists in light of at least the aforementioned drawbacks for the currently available methods.

SUMMARY OF THE INVENTION

A solution to at least some of the above-mentioned problems associated with currently available fertilizer compositions used for fertigation has been discovered. The solution resides in a solid acidic fertilizer granule that include a plant nutrient comprising phosphorus and an inorganic acid that is distributed throughout the solid fertilizer granule. A plant nutrient can make up the bulk or matrix or network of the granule, and the inorganic acid can be distributed throughout this bulk or matrix or network. These solid acidic fertilizers improve the solubility of the fertilizer in irrigation water with a high pH value by preventing or reducing the reaction between calcium in the irrigation water and the phosphorus in the fertilizer. Additionally, the fertilizer granules of the present invention avoid or reduce direct handling of concentrated inorganic acid by having the inorganic acid distributed throughout the granules. In preferred instances, the inorganic acid is not present on the surface of the granules. Furthermore, the acidic fertilizer granules of the present invention reduce the tendency of the fertilizers to absorb atmospheric water, lowering the cost for and complexity in keeping the granules dry during storage. Therefore, the fertilizer granules of the present invention provide several technical advantages over the currently available fertilizer compositions used for fertigation.

Some embodiments of the invention are directed to a solid acidic fertilizer granule. The solid acidic fertilizer granule can include a plant nutrient containing phosphorus and an inorganic acid that is distributed throughout the solid fertilizer granule. A plant nutrient can make up the bulk or matrix or network of the granule, and the inorganic acid can be distributed throughout this bulk or matrix. This can avoid or reduce the presence of an inorganic acid coating on the outer surface of the granule. In some aspects, the granule can include an effective amount of the inorganic acid sufficient to form a solution having a pH of less than 4 when at most 10 grams of the solid fertilizer granule(s) is dissolved in at least 100 ml of water having a pH of greater than 7, preferably greater than 7 to 9 or greater than 7 to 8, before the solid fertilizer granule is dissolved in the water. In some instances, the granule can include an effective amount of the inorganic acid sufficient to form a solution having a pH of less than 3.5, less than 3, less than 2.5, less than 2, less than 1.5, or less than 1. In some instances, the granule can include an effective amount of the inorganic acid sufficient to form the solution when at most 9 grams, at most 8 grams, at most 7 grams, at most 6 grams, at most 5 grams, at most 4 grams, at most 3 grams, at most 2 grams, or at most 1 gram of the solid fertilizer granule(s) is dissolved. In some instances, the solid fertilizer granule(s) is dissolved in at least 150 ml, at least 200 ml, at least 300 ml, at least 400 ml, at least 500 ml, at least 600 ml, at least 700 ml, at least 800 ml, at least 900 ml, at least 1000 ml, at least 2000 ml, or at least 3000 ml, etc. of water. In some instances the water has a pH of greater than 7.5, greater than 8.0, greater than 8.5, greater than 9.0, greater than 9.5, greater than 10.0, greater than 10.5, greater than 11.0, or greater than 11.5, etc. In some aspects, the water can contain at least 50 ppm calcium ($Ca^{2+}$) and an effective amount of the inorganic acid sufficient to prevent the formation of calcium phosphate from the phosphorus in the plant nutrient and the calcium in the water. In some instances, the water contains at least 100 ppm, at least 150 ppm, at least 200 ppm, at least 250 ppm, at least 300 ppm, at least 350 ppm, at least 400 ppm, at least 450 ppm, at least 500 ppm, at least 550 ppm, at least 600 ppm, at least 650 ppm, at least 700 ppm, at least 750 ppm, at least 800 ppm, at least 850 ppm, at least 900 ppm, at least 950 ppm, at least 1000 ppm, at least 1500 ppm, at least 2000 ppm, at least 2500 ppm, at least 3000 ppm, at least 3500 ppm, or at least 4500 ppm, etc. calcium.

In some aspects, the fertilizer granule can include 4 wt. % or more of the inorganic acid by weight of the fertilizer granule. In some aspects, the acidic fertilizer granule can include 2 wt. % to 40 wt. %, preferably 4 wt. % to 36 wt. %, preferably greater than 10 wt. % to 36 wt. % of the inorganic acid by weight of the fertilizer granule and all ranges and values there between. In some aspects, the fertilizer granule can contain 10 wt. % or more of the inorganic acid by weight of the fertilizer granule. In some instances, the inorganic acid is 2 wt. %, 4 wt. %, 6 wt. %, 8 wt. %, 10 wt. %, 12 wt. %, 14 wt. %, 16 wt. %, 18 wt. %, 20 wt. %, 22 wt. %, 24 wt. %, 26 wt. %, 28 wt. %, 30 wt. %, 32 wt. %, 34 wt. %, 36 wt. %, 38 wt. %, or 40 wt. %, or any range thereof, by weight of the fertilizer granule. The fertilizer granule can contain 60 wt. % to 98 wt. % of the phosphorous containing plant nutrient, preferably 70 wt. % to 95 wt. %, or more preferably 80 wt. % to 90 wt. % of the phosphorous containing plant nutrient.

Non-limiting example of the inorganic acid may include sulfuric acid, hydrochloric acid, nitric acid, or phosphoric acid, or any combination thereof. In some instances, the inorganic acid may include or consist of sulfuric acid.

In some aspects, the plant nutrients further include nitrogen, potassium, a secondary nutrient, a trace element, or any combination thereof. In some aspects, the plant nutrient may contain nitrogen, phosphorous, or potassium, or any combination thereof. In some instances, the fertilizer granule can include sulfur. In some instances, the fertilizer granule can have a N:P:K:S (nitrogen:phosphorus:potassium:sulfur) ratio (NPKS grade or NPK+S grade) by weight of about 7:19:12:15, about 7:19:12:10, about 9:25:7:8, about 10:5:10:10, about 18:18:0:6, about 13:13:13:11, about 10:19:10:10, about 10:10:20:13, about 8:15:8:9, about 11:6:17:12, about 8:8:23:14, about 10:10:10:10, about 8:5:26:15, about 6:16:6:8, about 6:29:6:8, about 10:5:15:12, about 11.5:11.5:11.5:9.8, about 18:9:9:9, about 8:26:8:9, about 12:12:12:10, about 12:30:0:6, about 7:34:0:6, or about 12:12:4:8. In some non-limiting instances, the term "about" is defined to be within 10%, 9%, 8%, 7%, 6%, 5%, 4%, 3%, 2%, 1%, or 0.5%.

In some aspects, the fertilizer granule can further contain one or more additional ingredients. Additional ingredients that can be contained in the granule include a preservative, insecticide, fungicide, fragrance, fertilizer, plant growth agent, nutrient, trace element, plant protection agent, filler, micronutrients, secondary nutrients, flow promotors, binders, pH adjusters or buffers, etc., or a combination thereof. In some instances, the granule does not contain one or more of the additional ingredients. The additional ingredients can be combined into the granule when the plant nutrient(s) is mixed to form a mixture. The granule can contain any amount of additional ingredients, such as 0.001 wt. % to 50 wt. %, 0.001 wt. % to 40 wt. %, 0.001 wt. % to 30 wt. %, 0.001 wt. % to 20 wt. %, 0.01 wt. % to 10 wt. %, 0.01 wt. % to 9 wt. %, 0.01 wt. % to 8 wt. %, 0.01 wt. % to 7 wt. %, or any range or value therein. In some instances, the granule can contain 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 2, 3, 4, 5, 6, 7, 8, 9, 10, 15, 20, 25, 30, 35, or 40 wt. % of additional ingredients.

In some instances, the fertilizer granule may further include a coating that contains one or more of water, one or more solubilizing agent(s), one or more binder(s), and/or one or more anticaking agent(s). In some instances, the fertilizer granule does not contain a coating. In some instances, the coating does not contain an inorganic acid. The coating can, in some instances, contain one or more binder(s) and/or one or more anticaking agent(s). In some instances, the water contained in the coating can be less than 5% by weight of the coating. Such a coating with reduced water or moisture content can be considered a dried or dry coating. In some instances, the water content is 4 wt. %, 3 wt. %, 2 wt. %, 1 wt. %, or less, compared to the weight of the coating. The solubilizing agent can be $Na_2CO_3$, NaOH, KOH, $Ca(OH)_2$, $Mg(OH)_2$, and/or $K_2CO_3$. The binder can be triple super phosphate (TSP), guar gum, waxes such as paraffin wax, oils such as linseed oils and paraffin oils, flours and starches such as bleached wheat flour, gelatins, and/or polymers. The anticaking agent can be any anticaking agent known, such as surfactants, amines, liquid carriers such as oil and/or water, and/or a URESOFT® product supplied by Kao Chemicals, such as URESOFT®-125, or any combination thereof. In embodiments of the invention, the coating can contain the components therein at any concentration, ratio, percent by weight, percent by volume, etc.

Also disclosed in the context of the present invention are fertilizer blends or compounded fertilizers containing the fertilizer granule and an additional fertilizer. The additional fertilizer can be, but is not limited to, nitrogen and phosphorus (NP), phosphorus and potassium (PK), nitrogen, phosphorus, and potassium (NPK), diammonium phosphate (DAP), monoammonium phosphate (MAP), single super-phosphate (SSP), triple super-phosphate (TSP), or a combination thereof. In one aspect, the additional fertilizer can include an inorganic acid. In other aspects, however, the additional fertilizer does not include an inorganic acid.

Also disclosed in the context of the present invention are methods of fertigation. In some aspects, the method of fertigation may include combining the solid acidic fertilizer granule or the fertilizer blend with water to form a fertigation solution having a pH less than 4, optionally combining the fertigation solution with additional water to form a fertilizer solution, and applying the fertigation solution or the fertilization solution to a crop. In some aspects of the invention, combining the fertilizer granule to the water decreases the pH of the water from a pH of 4 or greater to a pH of less than 4, less than 3.5, less than 3, less than 2.5, less than 2, less than 1.5, or less than 1. In some instances, the combining the fertilizer granule to the water decreases the pH of the water to a pH of less than 4 from a pH of 6.5 or greater, 7.0 or greater, 7.5 or greater, 8.0 or greater, 8.5 or greater, 9.0 or greater, 9.5 or greater, 10.0 or greater, 10.5 or greater, 11.0 or greater, or 11.5 or greater, or 6.5 to 11.5, or greater than 7.0 to 10, or greater than 7.0 to 9, or greater than 7.0 to 8.5. In one aspect, the applying step can include applying the fertigation solution or the fertilization solution to at least one of a soil, an organism, a crop, a liquid carrier, a liquid solvent, or a combination thereof. Application of the fertigation solution or the fertilization solution can promote plant growth and/or plant health.

In some aspects, the water used to form the fertigation solution or fertilizer solution can contain at least 50 ppm of calcium ($Ca^{2+}$). In some instances, the water comprises more than 100 ppm of calcium ($Ca^{2+}$), more than 200 ppm of calcium, more than 300 ppm of calcium, more than 400 ppm of calcium, more than 500 ppm of calcium, more than 600 ppm of calcium, more than 700 ppm of calcium, more than 800 ppm of calcium, more than 900 ppm of calcium, more than 1,000 ppm of calcium, more than 1,500 ppm of calcium, more than 2,000 ppm of calcium, more than 2,500 ppm of calcium, more than 3,000 ppm of calcium, more than 3,500 ppm of calcium, or more than 4,000 ppm of calcium. In some aspects, the water comprises at least 50 ppm of $Ca^{2+}$ to 1000 ppm of $Ca^{2+}$, or at least 50 ppm $Ca^{2+}$ to 500 ppm of $Ca^{2+}$, or at least 50 ppm of $Ca^{2+}$ to 250 ppm $Ca^{2+}$, or at least 50 ppm $Ca^{2+}$ to 150 $Ca^{2+}$.

Also disclosed in the context of the present invention are methods of making the solid acidic fertilizer granule. In some aspects, the method can include combining one or more plant nutrient including phosphorus and an effective amount of an inorganic acid to form the solid acidic fertilizer granule. In one aspect, one or more plant nutrient can make up the bulk or matrix or network of the granule, and the inorganic acid can be distributed throughout this bulk or matrix or network. In some aspects, a method of making the solid acidic fertilizer granule can include any one of, any combination of, or all of steps (a), (b), (c) and (d). In step (a) a slurry containing phosphorus (P) and optionally nitrogen (N) and/or potassium (K), can be provided. In some aspects, the slurry can be prepared from a phosphorus source. In some aspects, the slurry can be prepared by contacting and/or reacting a phosphorus (P) source and a nitrogen (N) source and/or a potassium (K) source. In some aspects, the nitrogen source can be ammonia. In some aspects, the phosphorus source can be phosphoric acid. In some aspects, the potassium source can potassium chloride and/or potassium sulfate. In step (b) the slurry can be acidified with an acid solution such as an inorganic acid to form a acidified slurry. In some aspects, the inorganic acid can be sulfuric acid and/or nitric acid. In some aspects, the acid solution can contain concentrated sulfuric acid. In some aspects, the acid solution can contain 95 wt. % to 99 wt. % sulfuric acid. In some aspects, the acid solution can contain about 98 wt. % sulfuric acid. In some aspects, the acid solution can contain concentrated nitric acid. In some aspects, the acid solution can contain 60 wt. % to 98 wt. %, or 60 wt. % to 70 wt. %, nitric acid. In some aspects, the acid solution can contain about 68 wt. % to about 70 wt. % nitric acid. In some aspects, the pH of the acidified slurry can be about 4 or less. In some aspects, steps (a) and (b) can be performed simultaneously or sequentially. In step (c) the acidified slurry can be contacted with a solid plant nutrient. The solid plant nutrient can be a plant nutrient in solid form (e.g. powdered form). In some aspects, steps (a), (b), and (c) can be performed simultaneously or sequentially. In some aspects, steps (b), and (c) can be performed simultaneously or sequentially. The plant nutrient can contain phosphorus, nitrogen, or potassium and/or any combination thereof. The solid plant nutrient can be granulated to form a wet acidic fertilizer granule containing phosphorus. To form the wet acidic fertilizer granule the acidified slurry can be contacted with the solid plant nutrient before, during, and/or after the granulation process of the plant nutrient. In some aspects, the plant nutrient contains premade and/or recycled solid acidic fertilizer. In some aspects, i) the acid solution and non-acidified slurry and/or ii) the acidified slurry can be contacted with the solid plant nutrient and the solid plant nutrient can be granulated to form the wet acidic fertilizer granule containing phosphorus. In some aspects, the slurry and the acid can simultaneously be contacted with the solid plant nutrient inside the granulator, and the slurry can be acidified during contacting with the solid plant nutrient. In some aspects, the slurry can be acidified first and then the acidified slurry can be contacted with the solid plant nutrient. The i) acid solution and the non-acidified slurry and/or ii) the acidified slurry can be contacted with the solid plant nutrient before, during and/or after the granulation process of the solid plant nutrient to form the wet acidic fertilizer granule. The non-acidified slurry refers to the slurry containing phosphorus and optionally nitrogen and/or potassium, that has not been acidified with the acid solution. In some aspects, the plant nutrient can contain nitrogen (N) and/or potassium (K), and the wet acidic fertilizer granule produced in step (c) can contain phosphorus and one or more of nitrogen and/or potassium. In some instances, the solid plant nutrient can be and/or contain, but is not limited to, phosphorus (P) source, nitrogen (N) source, potassium (K) source, nitrogen and phosphorus (NP) source(s), phosphorus and potassium (PK) source(s), nitrogen, phosphorus, and potassium (NPK) source(s), diammonium phosphate (DAP), monoammonium phosphate (MAP), single superphosphate (SSP), or triple super-phosphate (TSP), or any combination thereof. In some aspects, the wet acidic fertilizer granule can contain 2 wt. % to 5 wt. % or 3 to 4 wt. % of water, e.g. moisture. In step (d) the wet acidic fertilizer granule can be dried to form the solid acidic fertilizer granule. In some aspects, the solid fertilizer granule can be passed through a size screen to obtained solid acidic fertilizer granule of desired or target size. In some aspects, a portion of the solid acidic fertilizer granules produced can be fed back (recycled) into the methods of making the solid acidic fertilizer granule. In some aspects, the recycled material can be used as all or a portion of the solid plant nutrient of step (c).

In some aspects, the solid acidic fertilizer granule can be combined with an additional fertilizer to form a fertilizer blend or compounded fertilizer. In some instances, the additional fertilizer combined to form a fertilizer blend or compounded fertilizer can be, but is not limited to, nitrogen and phosphorus (NP), phosphorus and potassium (PK), nitrogen, phosphorus, and potassium (NPK), diammonium phosphate (DAP), monoammonium phosphate (MAP), single superphosphate (SSP), triple super-phosphate (TSP), or a combination thereof In the context of the present invention, at least the following 29 aspects are described.

Aspect 1 is directed to a solid acidic fertilizer granule comprising a plant nutrient comprising phosphorus; and an inorganic acid that is distributed throughout the solid fertilizer granule.

Aspect 2 is directed to the fertilizer granule of aspect 1, wherein the granule comprises an effective amount of the inorganic acid sufficient to form a solution having a pH of less than 4 when at most 10 grams of the solid fertilizer granule(s) is dissolved in at least 100 ml of water having a pH of greater than 7 before the solid fertilizer granule is dissolved in the water.

Aspect 3 is directed to the fertilizer granule of aspect 2, wherein the water comprises at least 50 ppm calcium ($Ca^{2+}$), and wherein the inorganic acid prevents the formation of calcium phosphate from the phosphorus in the plant nutrient and the calcium in the water.

Aspect 4 is directed to the fertilizer granule of any one of aspects 1 to 3, comprising 4 wt. % or more of the inorganic acid by weight of the fertilizer granule.

Aspect 5 is directed to the fertilizer granule of aspect 4, comprising 2 wt. % to 40 wt. %, preferably 4 wt. % to 36 wt. %, more preferably 10 wt. % to 36 wt. %, most preferably 30 wt. % to 35 wt. % of the inorganic acid by weight of the fertilizer granule.

Aspect 6 is directed to the fertilizer granule of any one of aspects 4 to 5, comprising 10 wt. % or more of the inorganic acid by weight of the fertilizer granule.

Aspect 7 is directed to the fertilizer granule of any one of aspects 1 to 7, wherein the inorganic acid comprises sulfuric acid, hydrochloric acid, nitric acid, or phosphoric acid, or any combination thereof.

Aspect 8 is directed to the fertilizer granule of aspect 7, wherein the inorganic acid comprises sulfuric acid.

Aspect 9 is directed to the fertilizer granule of any one of aspects 1 to 8, wherein the plant nutrient further comprises nitrogen, potassium, a secondary nutrient, or a trace element, or any combination thereof.

Aspect 10 is directed to the fertilizer granule of any one of aspects 1 to 9, wherein the plant nutrient further comprises nitrogen or potassium, or any combination thereof.

Aspect 11 is directed to the fertilizer granule of any one of aspects, the fertilizer granule of any one of claims 1 to 10, wherein the fertilizer granule includes a N:P:K:S weight ratio of about 7:19:12:15, about 7:19:12:10, about 9:25:7:8, about 10:5:10:10, about 18:18:0:6, about 13:13:13:11, about 10:19:10:10, about 10:10:20:13, about 8:15:8:9, about 11:6:17:12, about 8:8:23:14, about 10:10:10:10, about 8:5:26:15, about 6:16:6:8, about 6:29:6:8, about 10:5:15:12, about 11.5:11.5:11.5:9.8, about 18:9:9:9, about 8:26:8:9, about 12:12:12:10, about 12:30:0:6, about 7:34:0:6, or about 12:12:4:8.

Aspect 12 is directed to a fertilizer blend or a compounded fertilizer comprising the fertilizer granule of any one of aspects 1 to 11 and an additional fertilizer.

Aspect 13 is directed to a method of fertigation, the method comprising: combining the solid acidic fertilizer granule of any one of aspects 1 to 11 or the fertilizer blend of aspect 12 with water to form a fertigation solution having a pH less than 4; optionally combining the fertigation solution with additional water to form a fertilizer solution; and applying the fertigation solution and/or the fertilization solution to a crop.

Aspect 14 is directed to the method aspect 13, wherein combining the fertilizer granule to the water decreases the pH of the water from a pH of 4 or greater to a pH of less than 4.

Aspect 15 is directed to the method of any one of aspects 13 to 14, wherein combining the fertilizer granule to the water decreases the pH of the water to a pH of less than 4 from a pH of 6.5 or greater, 7.0 or greater, 7.5 or greater, 8.0 or greater, 8.5 or greater, or 9.0 or greater.

Aspect 16 is directed to the method of any one of aspects 13 to 15, wherein the water comprises at least 50 ppm of calcium ($Ca^{2+}$).

Aspect 17 is directed to the method of any one of aspects 13 to 16, wherein the water comprises more than 100 ppm of calcium ($Ca^{2+}$), more than 200 ppm of calcium, more than 500 ppm of calcium, more than 1,000 ppm of calcium, more than 1,500 ppm of calcium, more than 2,000 ppm of calcium, more than 2,500 ppm of calcium, or more than 3,000 ppm of calcium.

Aspect 18 is directed to the method of any one of aspects 13 to 17, wherein the fertilizer granule comprises 4 wt. % to 40 wt. %, preferably 4 wt. % to 36 wt. %, more preferably 10 wt. % to 36 wt, % most preferably 30 wt. % to 35 wt. %, of the inorganic acid by weight of the fertilizer granule.

Aspect 19 is directed to a method of making the solid acidic fertilizer granule of any one of aspects 1 to 11, the method comprising combining a plant nutrient comprising phosphorus and an effective amount of an inorganic acid to form the solid acidic fertilizer granule.

Aspect 20 is directed to the method of aspect 19, wherein the combining comprises: (a) providing a slurry comprising phosphorus; (b) acidifying the slurry with an acid solution comprising an inorganic acid to obtain an acidified slurry; (c) contacting the acidified slurry with a solid plant nutrient and granulating the solid plant nutrient to form a wet acidic fertilizer granule; and (d) drying the wet acidic fertilizer granule to form the solid acidic fertilizer granule.

Aspect 21 is directed to the method of aspect 20, wherein the slurry further comprises nitrogen and/or potassium.

Aspect 22 is directed to the method of any one of aspects 20 or 21, wherein the solid plant nutrient comprises i) ammonium sulfate and ii) potassium sulfate and/or potassium chloride.

Aspect 23 is directed to the method of any one of aspects 19 to 22, wherein the solid plant nutrient and/or plant nutrient comprising phosphorus comprises phosphorus, nitrogen, and/or potassium.

Aspect 24 is directed to the method of any one of aspects 19 to 23, wherein the solid plant nutrient and/or plant nutrient comprising phosphorus comprises a NPK fertilizer.

Aspect 25 is directed to the method of any one of aspects 19 to 24, wherein the inorganic acid comprises sulfuric acid and/or nitric acid.

Aspect 26 is directed to the method of any one of aspects 20 to 25, wherein pH of the acidified slurry is 4 or less.

Aspect 27 is directed to the method of any one of aspects 20 to 26, wherein the wet acidic fertilizer granule contains 2 wt. % to 5 wt. % of moisture and the solid acidic fertilizer granule contains less than 1 wt. % of moisture.

Aspect 28 is directed to the method of any one of aspects 20 to 27, wherein the solid acidic fertilizer granules obtained from drying the wet acidic fertilizer granules are passed through a size screen to select solid acidic fertilizer granules with a required size, such as with an average diameter 0.5 mm to 6 mm, or 1 mm to 4 mm, and the solid acidic fertilizer granules having a size smaller or larger than the required size are recycled to step (c) as a recycled solid acidic fertilizer.

Aspect 29 is directed to a method of making a fertilizer blend or a compounded fertilizer, wherein the solid acidic fertilizer granule of any one of aspects 1 to 11, or the solid acidic fertilizer granule made with the method of any one of aspects 20 to 28, is combined with an additional fertilizer to form the fertilizer blend or the compounded fertilizer.

The following includes definitions of various terms and phrases used throughout this specification.

The term "fertilizer" is defined as a material applied to soils or to plant tissues to supply one or more plant nutrients essential or beneficial to the growth of plants and/or stimulants or enhancers to increase or enhance plant growth. Non-limiting examples of fertilizers include materials having one or more of urea, ammonium nitrate, calcium ammonium nitrate, one or more superphosphates, binary NP fertilizers, binary NK fertilizers, binary PK fertilizers, NPK fertilizers, molybdenum, zinc, copper, boron, cobalt, and/or iron. In some aspects, fertilizers include agents that enhance plant growth and/or enhance the ability for a plant to receive the benefit of a fertilizer, such as, but not limited to biostimulants, urease inhibitors, and nitrification inhibitors. In some particular instances, the fertilizer is urea, such as urea granules.

The terms "about," "approximately," and "substantially" are defined as being close to, as understood by one of ordinary skill in the art. In one non-limiting instance, the terms are defined to be within 10%, preferably within 5%, more preferably within 1%, and most preferably within 0.5%.

The terms "wt. %," "vol. %," or "mol. %" refers to a weight, volume, or molar percentage of a component, respectively, based on the total weight, the total volume, or the total moles of material that includes the component. In a non-limiting example, 10 grams of a component in 100 grams of the material that includes the component is 10 wt. % of component.

The use of the words "a" or "an" when used in conjunction with any of the terms "comprising," "including," "containing," or "having" in the claims or the specification may mean "one," but it is also consistent with the meaning of "one or more," "at least one," and "one or more than one."

The phrase "and/or" can include "and" or "or." To illustrate, A, B, and/or C can include: A alone, B alone, C alone, a combination of A and B, a combination of A and C, a combination of B and C, or a combination of A, B, and C.

The words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

The compositions and process of the present invention can "comprise," "consist essentially of," or "consist of" particular ingredients, components, compositions, etc., disclosed throughout the specification. With respect to the transitional phase "consisting essentially of," in one non-limiting aspect, a basic and novel characteristic of the solid acidic fertilizer of the present invention is that the solid acidic fertilizer contains inorganic acid that is distributed throughout the solid fertilizer granule.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes, combinations, and modifications within the spirit and scope of the invention will become apparent to those skilled in the art from this detailed description.

BRIEF DESCRIPTION OF THE DRAWINGS

Advantages of the present invention may become apparent to those skilled in the art with the benefit of the following non-limiting detailed description and upon reference to the accompanying non-limiting drawings. The drawings may not be to scale.

DETAILED DESCRIPTION OF THE INVENTION

The solid acidic fertilizer granules of the present invention provide an elegant solution to at least some problems associated with conventional fertilizers used in fertigation. Notably, the solid acidic fertilizer granules include a phosphorus-containing plant nutrient and an inorganic acid that is distributed throughout the solid fertilizer granule, so that the nutrient can be dissolved in calcium-containing irrigation water that has a high pH value. Furthermore, the solid acidic fertilizer granules prevent the safety risks of handling fertilizer granules having highly concentrated inorganic acid on the surfaces thereof. Moreover, the solid acidic fertilizer granules may be capable of reducing storage cost and complexity as compared to acidified fertilizer with an acidic coating. Also, by distributing the inorganic acid throughout the bulk of the granule instead of only on its surface (e.g., surface coating), absorption of atmospheric water can be reduced.

These and other non-limiting aspects of the present invention are discussed in further detail in the following sections with reference to the Figures.

A. Solid Acidic Fertilizer

1. Solid Acidic Fertilizer Granule

Figure 4A:
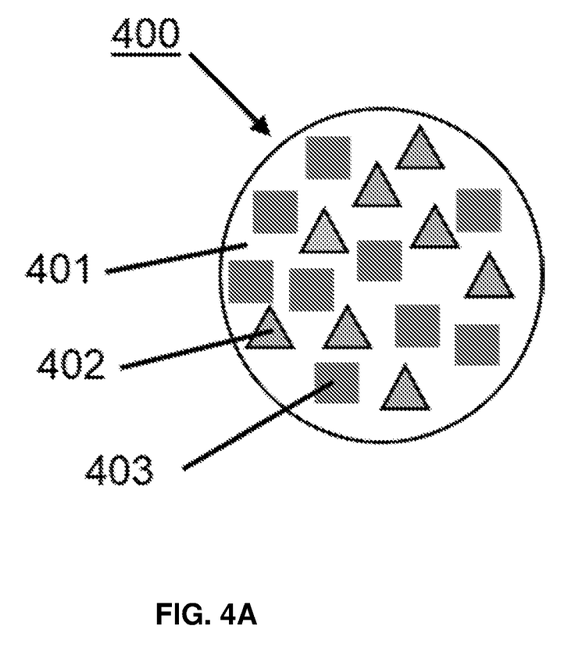
FIGS. 4A and 4B are schematic diagrams depicting non-limiting embodiments of a solid acidic fertilizer granule of the present invention with the plant nutrient(s), inorganic acid, and/or other plant nutrient(s) mixed heterogeneously (FIG. 4A) and homogenously (FIG. 4B).
Figure 4B:
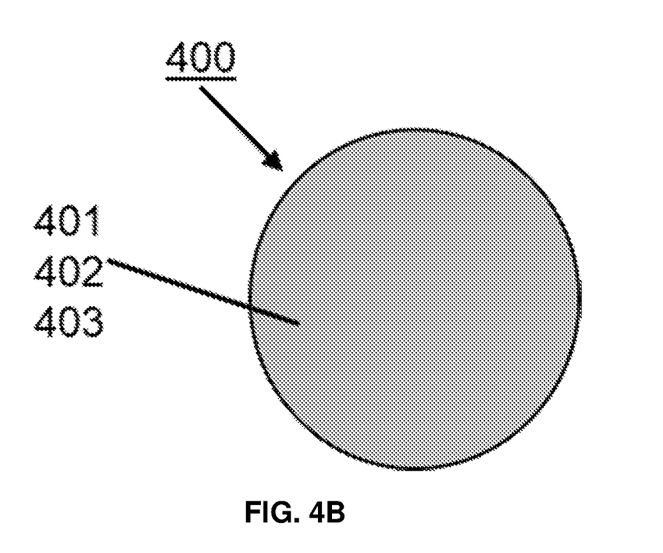

In some embodiments, the solid acidic fertilizer granule of the present invention can contain a plant nutrient containing phosphorus and an inorganic acid. As shown in FIGS. 4A and 4B, the solid acidic fertilizer granule (400) can contain a plant nutrient (402) containing phosphorus material that can form the bulk of the fertilizer granule (400). The inorganic acid (403) can be distributed throughout the bulk of the granule. The solid acidic fertilizer granule can optionally contain one or more binders or other plant nutrients (401).

The solid acidic fertilizer may further include one or more of nitrogen and potassium containing nutrients. The plant nutrient can be synthetically made. Non-limiting examples of plant nutrients include nitrogen and phosphorus (NP)

fertilizers, phosphorus and potassium (PK) fertilizers, nitrogen, phosphorus, and potassium (NPK) fertilizers, diammonium phosphate (DAP), monoammonium phosphate (MAP), single superphosphate (SSP), triple super-phosphate (TSP), or a combination thereof. In some aspects, the solid acidic fertilizer may include a secondary nutrient, one or more trace elements, one or more anticaking agents, water, one or more pigments, or a combination thereof. Non-limiting examples of anticaking agents include surfactants, amines, liquid carriers such as oil and/or water, and/or a URESOFT® product supplied by Kao Chemicals (Kao Corporation, Japan), such as URESOFT®-125.

In some embodiments, the solid acidic fertilizer granule can contain at least 50 wt. % or more of the plant nutrient, based on the total weight of the solid acidic fertilizer granule. The solid acidic fertilizer granule can contain at least 55 wt. %, 60 wt. %, 65 wt. %, 70 wt. %, 75 wt. %, 80 wt. %, 85 wt. %, 90 wt. %, 95 wt. %, 100 wt. %, or any concentration therein of the plant nutrient based on the total weight of the solid acidic fertilizer granule. The plant nutrient can form the bulk of the granule. The terms bulk, matrix, and network can be used interchangeably in this specification when referencing the solid acidic fertilizer granule. The inorganic acid can be evenly distributed throughout the bulk of the granule by: (1) adding a solution of inorganic acid to particles of the plant material to form a paste; (2) forming granules from the paste; and optionally (3) drying the granules. Alternatively, particles of the plant nutrient material and particles of inorganic acid can be mixed together to form a solid mixture. Granules can be formed from the solid mixture (e.g., by compaction); by having more (volume %) of the solid plant nutrient particles relative to the inorganic acid particles, the plant nutrient particles can make up the bulk of the granules, and the inorganic acid particles can be evenly distributed throughout the bulk.

It is contemplated that the fertilizer granules of the present invention can include any amount of the ingredients discussed in this specification. The granules can also include any number of combinations of additional ingredients described throughout this specification. The concentrations of the any ingredient within the compositions can vary. In non-limiting embodiments, for example, the compositions can comprise, consisting essentially of, or consist of, in their final form, for example, at least about 0.0001%, 0.0010%, 0.0020%, 0.0030%, 0.0040%, 0.0050%, 0.0060%, 0.0070%, 0.0080%, 0.0090%, 0.0100%, 0.0200%, 0.0300%, 0.0400%, 0.0500%, 0.0600%, 0.0700%, 0.0800%, 0.0900%, 0.1000%, 0.2000%, 0.3000%, 0.4000%, 0.5000%, 0.6000%, 0.7000%, 0.8000%, 0.9000%, 1.0%, 2.0%, 3.0%, 4.0%, 5.0%, 6.0%, 7.0%, 8.0%, 9.0%, 10%, 20%, 30%, 35%, 40%, 45%, 50%, 60%, 65%, 70%, 75%, 80%, 85%, 90%, 95%, 99%, 100%, or any range or concentration derivable therein, of at least one of the ingredients that are mentioned throughout the specification and claims. In non-limiting aspects, the percentage can be calculated by weight or volume of the total composition. A person of ordinary skill in the art would understand that the concentrations can vary depending on the addition, substitution, and/or subtraction of ingredients in a given composition.

2. Coating for the Solid Acidic Fertilizer Granule

In some aspects, the solid acidic fertilizer granule can include a coating that contains one or more of water, one or more solubilizing agent(s), one or more binders, and/or one or more anticaking agents. In some instances, the water contained in the coating can be less than 5% by weight of the coating and be considered a dried or dry coating. In some instances, the water content in the coating is less than 4 wt. %, 3 wt. %, 2 wt. %, or 1 wt. % of the weight of the coating.

In some aspects, the coating of the acidic fertilizer granule does not contain the inorganic acid. In some aspects, the coating can contain one or more pigments.

It is contemplated that the solid acidic fertilizer granule of the present invention can contain a coating in any amount, volume, thickness, coverage of the fertilizer granule surface, etc. In some instances, the coating is 0.001 wt. % to 10 wt. %, 0.001 wt. % to 9 wt. %, 0.001 wt. % to 8 wt. %, 0.001 wt. % to 7 wt. %, 0.001 wt. % to 6 wt. %, 0.01 wt. % to 10 wt. %, 0.1 wt. % to 10 wt. %, 0.5 wt. % to 10 wt. %, 0.5 wt. % to 9 wt. %, 0.5 wt. % to 8 wt. %, 0.5 wt. % to 7 wt. %, 0.5 wt. % to 6 wt. %, 1 wt. % to 6 wt. %, or any range therein, of solid acidic fertilizer granule based on the total weight of the coated solid acidic fertilizer granule, or any range therein. In some aspects, at least a portion of the solid acidic fertilizer granule's surface can be in direct contact with the coating. In some instances, the coating is not dispersed throughout the fertilizer granule. In some instances, the coating forms a shell at least partially coating the granule. The coating can coat at least 55%, 60%, 65%, 70%, 75%, 80%, 85%, 90%, 95%, or 100% or more of the surface of the granule. The granule can be coated by the coating so that dissolution of water into the core is decreased as compared to the granule without the coating. In some instances, the coating has a mean average thickness of 2 to 70 µm, 2 to 20 µm, 20 to 50 µm, or 10 to 40 µm, or any range or thickness therein.

3. Blended or Compounded Fertilizers

The solid acidic fertilizer of the present invention can be included with other fertilizers in a fertilizer composition. In some instances, the solid acidic fertilizer is contained in a blended fertilizer composition or a compounded fertilizer. Additional fertilizers can be chosen based on the particular needs of certain types of soil, climate, or other growing conditions to maximize the efficacy of the blended composition in enhancing plant growth and crop yield. The solid acidic fertilizer herein can be blended with other fertilizer at any concentration. In some instances, the desired concentration is sufficient to meet the required nutrient or micronutrient content in the blend. By way of example, a blended fertilizer composition of the present invention can be formulated into a quick release fertilizer. Alternatively, the blended fertilizer composition can be formulated into a slow-release fertilizer. In some instances, the blended fertilizer composition is formulated into a specialty fertilizer.

B. Method of Making Solid Acidic Fertilizer Granule

Figure 1:
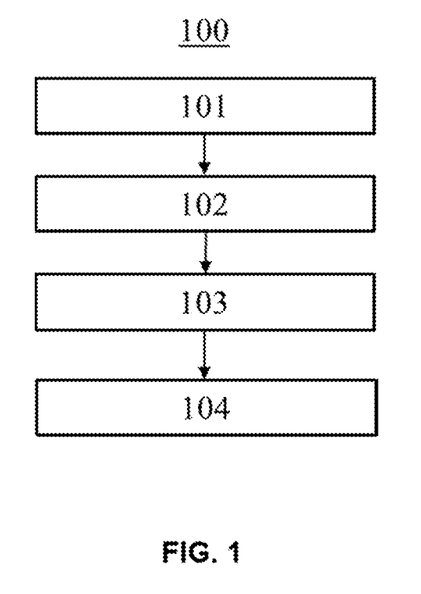
FIG. 1 is a schematic diagram depicting an exemplary method of producing a non-limiting embodiment of a solid acidic fertilizer granule of the present invention.

With reference to FIG. 1, a non-limiting method (100) of making the solid acidic fertilizer granule can include combining the plant nutrient comprising phosphorus and an effective amount of an inorganic acid to form the solid acidic fertilizer granule (101). In some aspects the combining can be done by mixing two or more of the components of the solid acidic fertilizer to form a substantially homogenous (as shown in FIG. 4B), bi-phasic/tri-phasic, etc., or heterogeneous (as shown in FIG. 4A) mixture. In preferred aspects, the two or more of the components of the solid acidic fertilizer are mixed to form a homogenous mixture (as shown in FIG. 4B). In some instances, the inorganic acid can be added and mixed with the other ingredients as a liquid inorganic acid before drying to form the solid acidic fertilizer granule. In some instances, additional components are added after the mixing of the components of the solid acidic fertilizer. In some aspects, the inorganic acid is combined so that the inorganic acid is homogenously distributed throughout the solid acidic fertilizer granule. In some aspects, the combining may include reacting phosphoric acid with ammonia in a reaction unit to form a paste (e.g. a slurry) of nitrogen-phosphorus, optionally adding potassium and/or other additional additives to the nitrogen-phosphorus paste, and producing the solid fertilizer granules using a granulation unit. In some aspects, the inorganic acid can be added in the reaction unit before, after, and/or during the reaction between phosphoric acid and ammonia. In some aspects, as an alternative to, or in addition to adding the inorganic acid in the reaction unit, the inorganic acid can be added in the granulation unit before, after, and/or during the granulation of the paste. In some instances, the inorganic acid added in the reaction unit and/or the granulation unit can be concentrated sulfuric acid, preferably 98 wt. % sulfuric acid. The inorganic acid added in the reaction unit may be in particulate form and/or dissolved in a solution In some aspects, the additional additives can include a secondary nutrient, one or more trace elements, one or more anticaking agents, water, one or more pigments, or a combination thereof. Non-limiting examples of anticaking agents include surfactants, amines, liquid carriers such as oil and/or water, and/or a URESOFT® product supplied by Kao Chemicals (Kao Corporation, Japan), such as URESOFT®-125. In some aspects, the additional additives can be less than 5 wt. % of the total weight of the paste (e.g. slurry). In some aspects, about 20 to 40 wt. % of the sulfuric acid based on the weight of the paste can be added to the paste in the reaction unit to adjust or maintain a pH of lower than 4.0. However, one or more inorganic acids can be used, and acids other than sulfuric acid can be used. The acid(s) can be added at one or in multiple steps in the method of making the solid acidic fertilizer.

In some aspects, the reaction unit for reacting phosphoric acid with ammonia can include a pre-neutralizer unit or T-Tube reactor. In some aspects, potassium added to the nitrogen-phosphorus paste (e.g. slurry) may be contained in potash materials, including but not limited to potassium sulfate and potassium chloride. In some aspects, adding the inorganic acid solution and/or particulate inorganic acid to the paste (e.g. slurry) can include mixing the inorganic acid with the paste (e.g. slurry). Mixing can be performed by processes such as stirring, vortexing, homogenizing, shaking, pouring, etc. In some aspects, the mixing can facilitate the inorganic acid being homogenously or substantially homogenously distributed throughout the solid acidic fertilizer.

In some aspects, one or more of the ingredients mixed can be heated during mixing or pre-heated before mixing. In some instances, the ingredients are heated to room temperature or up to 90° C. or more. If additional ingredients, including an additional fertilizer, are included, the additional ingredients can be added at any time in the production of the solid acidic fertilizer and/or can be added after the solid acidic fertilizer is formed.

In some aspects, a solid plant nutrient containing phosphorus, nitrogen, potassium or any combination thereof can be provided in a granulator. The solid plant nutrient can be a plant nutrient in solid form (e.g. powdered form). A slurry can be prepared from a phosphorus source in a pre-neutralizer and/or a pipe cross reactor. In some aspects, the slurry can be prepared by contacting and/or reacting the phosphorus source (P) and a nitrogen source and/or a potassium source in the pre-neutralizer and/or the pipe cross reactor. An acid solution can be added to the pre neutralizer, the granulator, and/or a scrubber such as to a scrubbing solution of the granulator and can be contacted with the slurry to form an acidified slurry. The i) acid solution and non acidified slurry and/or ii) acidified slurry can be contacted with the solid plant nutrient inside the granulator. In some aspects, the acidified slurry can be sprayed on the solid plant nutrient inside the granulator before, during, and/or after a granulation process of the plant nutrient to form a wet acidic fertilizer granule containing phosphorus. The wet acidic fertilizer granule can be dried to form a solid acidic fertilizer granule. The solid acidic fertilizer granules can be passed through a size screen and/or screening set to select and obtain the fertilizer granules (101) with desired or target size and the granules without the desired or target size can be recycled. In some aspects, the granules with a smaller size than the desired or target size can be sent back to the granulator. In some aspects, the granules with a larger size than the desired or target size can be crushed, ground, and/or powdered and can be sent back to the granulator. In some aspects, the fertilizer granules, e.g., fertilizer granules (101) can have an average diameter of 1 mm to 4 mm or at least any one of, equal to any one of, or between any two of 0.5 mm, 1 mm, 2 mm, 3 mm, 4 mm, 5 mm, and 6 mm.

In some aspects, the solid plant nutrient can be, but is not limited to, a phosphorus (P) source and/or fertilizer; a nitrogen (N) source and/or fertilizer; a potassium (K) source and/or fertilizer; a nitrogen and phosphorus (NP) source and/or fertilizer; a phosphorus and potassium (PK) source and/or fertilizer; a nitrogen, phosphorus, and potassium (NPK) source and/or fertilizer; diammonium phosphate (DAP); monoammonium phosphate (MAP); single super-phosphate (SSP); or triple super-phosphate (TSP); or any combination thereof. In some aspects, the solid plant nutrient can be a NPK fertilizer, and the NPK fertilizer along with ammonium sulfate and potassium sulfate, and/or potassium chloride, can be provided in the granulator. In some aspects, a blend containing the NPK fertilizer, and ammonium sulfate and potassium sulfate, and/or potassium chloride, can be provided in the granulator and the acidified slurry can be sprayed over the blend before, during and/or after a granulation process of the blend to produce the wet acidic fertilizer granule. In some aspects, the NPK fertilizer can have N:P:K weight ratio of about 7:19:12, about 9:25:7, about 10:19:10, about 10:10:20, about 8:15:8, about 11:6:17, about 8:8:23, about 8:5:26, about 6:16:6, about 6:29:6, about 10:5:15, about 8:26:8, about 12:12:8, about 11:29:19, about 14:38:10, about 16:8:16, about 20:20:20, about 15:30:15, about 15:15:30, about 17:10:27, about 12:12:36, about 13:5:40, about 10:25:10, about 10:45:10, about 16:8:24, about 28:14:14, or about 13:40:13, or any combination thereof.

In some aspects, the granulator can be a rotating drum granulator. In some aspects, the granulation process conditions includes a temperature of 70° C. to 85° C., or at least any one of, equal to any one of, or between any two of 60° C., 65° C., 70° C., 75° C., 80° C., 85° C., 90° C., 95° C., and 100° C. In some aspects, the slurry and/or acidified slurry can be sprayed at a controlled rate such that no and/or a relatively lesser amount of lumps are formed during the granulation process. In some aspects, the slurry and/or acidified slurry can be sprayed at a rate 8 m$^3$/hr to 10 m$^3$/hr or at least any one of, equal to any one of, or between any two of 6 m$^3$/hr, 7 m$^3$/hr, 8 m$^3$/hr, 9 m$^3$/hr, 10 m$^3$/hr, 11 m$^3$/hr, and 12 m$^3$/hr, on the plant nutrient and/or a blend containing the plant nutrient.

In some aspects, the slurry can be prepared by contacting and/or reacting ammonia and phosphoric acid in the pre neutralizer and/or the pipe cross reactor at a temperature of 110° C. to 120° C., or at least any one of, equal to any one of, or between any two of 90° C., 100° C., 110° C., 115° C., 120° C., 130° C., and 140° C. The acid solution can contain an inorganic acid. In some aspects, the inorganic acid can be sulfuric acid and/or nitric acid. In some aspects, the acid solution can contain 90 wt. % to 99 wt. % or at least any one of, equal to any one of, or between any two of 90 wt. %, 91 wt. %, 92 wt. %, 93 wt. %, 94 wt. %, 95 wt. %, 96 wt. %, 97 wt. %, 97.5 wt. %, 98 wt. % and 99 wt. % of sulfuric acid. In some aspects, the acid solution can contain 55 wt. % to 70 wt. % or at least any one of, equal to any one of, or between any two of 55 wt. %, 56 wt. %, 58 wt. %, 60 wt. %, 61 wt. %, 62 wt. %, 63 wt. %, 64 wt. %, 65 wt. %, 66 wt. %, 67 wt. %, 67.7 wt. %, 68 wt. %, 69 wt. %, and 70 wt. % nitric acid. In some aspects, pH of the acidified slurry can be about 4 or less; or about 3 or less; or about 2 or less; or about 1 or less.

In some aspects, the wet acidic fertilizer granule can contain 2 wt. % to 5 wt. % or at least any one of, equal to any one of, or between any two of 2 wt. %, 3 wt. %, 4 wt. % and 5 wt. % of water i.e. moisture. In some aspects, recycled acidic fertilizer, solid plant nutrient, potassium sulfate, potassium chloride, and/or ammonium sulfate can be added to the granulator if the wet acidic fertilizer granules contain greater than 8 wt. %, 5 wt. %, and/or 4 wt. % of water i.e. moisture. In some aspects, the wet acidic fertilizer granule can be dried in a dryer at a temperature of 200° C. to 350° C., or at least any one of, equal to any one of, or between any two of 150° C., 175° C., 200° C., 225° C., 250° C., 275° C., 300° C., 325° C., 350° C., 375° C., and 400° C. In some aspects, the dryer outlet temperature can be controlled using variable flows of hot air. In some aspects, the dryer outlet temperature can be 70° C. to 85° C., or at least any one of, equal to any one of, or between any two of 60° C., 65° C., 70° C., 75° C., 80° C., 85° C., 90° C., 95° C., and 100° C. In some aspects, the solid acidic fertilizer granules obtained from drying the wet acidic fertilizer granule can have less than 1 wt. % of water i.e. moisture.

The method (100) can include coating the fertilizer granule (101) with one or more of water, one or more solubilizing agent(s), one or more binders, and/or one or more anticaking agents (102). The one or more of water, one or more solubilizing agent(s), one or more binders, and/or one or more anticaking agents can be applied to the acidic fertilizer granule by a variety of methods, such as spraying, pouring, mixing, blending, etc. A fluid bed sprayer or coater, a liquid spray mixer, a rotating drum or pan, spray coating at discharge point, a paddle mixer, etc. can be used.

If more than one layer is desired, the acidic fertilizer granule can then be coated with a second, third, fourth, or more layers of one or more of water, one or more solubilizing agent(s), one or more binders, and/or one or more anticaking agents before or after the first coating dries on the core (not shown). For each layer, the amount of time used to apply the coating can be an amount sufficient to ensure that a substantially even layer is formed on the core and/or formed on the subsequent layer. In some instances, the application times can include 5 minutes, 10 minutes, 30 minutes, 1, hour, 2 hours, 3 hours, 4 hours, 5 hours, or more or any range therein (e.g., 5 minutes to 5 hours, 5 minutes to 1 hour, etc.). In some instances, the ingredients are heated to room temperature or up to 90° C. or more.

In some instances, optionally, the acidic fertilizer granule can be dried (103). The acidic fertilizer granule can be dried by processes such as exposure to ambient air, heated sweep gas, unheated sweep gas, heat, etc. In some aspects, the dried acidic fertilizer granule can include less than 2.0 wt. % moisture content. In some aspects, the method (100) can include optionally combining additional fertilizers with the solid acidic fertilizer granule to form a blended or compounded fertilizer (104). Combining can be performed by any type of blending or mixing apparatus generally available in the art (e.g., WJ-700, WJ-900, or WJ-1000 Mixing Machines from Whirlston Machinery (Zhengzhou, China). Once combined, the fertilizer blend can be stored for future use or sale.

Alternatively, the solid acidic fertilizer granules can be produced by a method including grinding readily available non-acidic fertilizer granules into powder, mixing the powder with concentrated inorganic acid solution or inorganic acid particulate to form a mixture, and producing the acidic fertilizer granules using the mixture in a granulation unit.

The solid acidic fertilizer granule can be produced in a batch or continuous process. In some instances, the solid acidic fertilizer granule is produced on an industrial scale. In some instances, the solid acidic fertilizer granule is produced at 1 kg/hour or less, or up to 10,000 kg/hour or more.

C. Method of Fertigation Using Solid Acidic Fertilizer Granule

Figure 2:
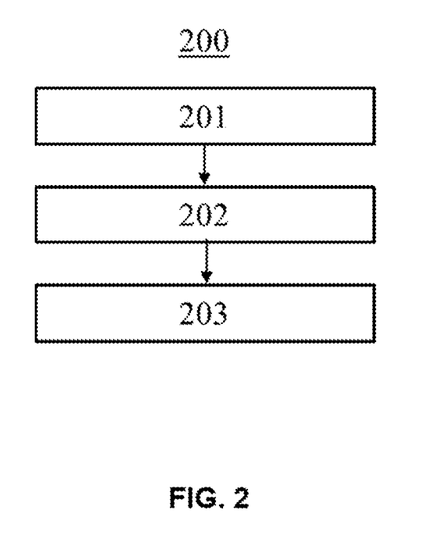
FIG. 2 is a schematic diagram depicting an exemplary method of using non-limiting embodiments of solid acidic fertilizer granules of the present invention in fertigation.

With reference to FIG. 2, a non-limiting method (200) of fertigation using the solid acidic fertilizer granule can include combining the solid acidic fertilizer granule with water to form a fertigation solution having a pH less than 4 (201). In some aspects, optionally, the method (200) can include combining fertigation solution with additional water to form a fertilizer solution (202). In some aspects, the method (200) can include applying the fertigation solution or the fertilization solution to a crop (203). In some aspects, the applying (203) can include adding the fertigation solution or the fertilization solution to an irrigation system and applying the fertigation solution or the fertilization solution to a soil and/or a plant via irrigation.

Non-limiting examples of plants that can benefit from the fertilizer of the present invention include vines, trees, shrubs, stalked plants, ferns, etc. The plants may include orchard crops, ornamental plants, food crops, timber, and harvested plants. The plants may include Gymnosperms, Angiosperms, and/or Pteridophytes.

EXAMPLES

The present invention will be described in greater detail by way of specific examples. The following examples are offered for illustrative purposes only, and are not intended to limit the invention in any manner. Those of skill in the art will readily recognize a variety of noncritical parameters, which can be changed or modified to yield essentially the same results.

Example 1

(Production of Solid Acidic Fertilizer Granule)

Figure 3A:
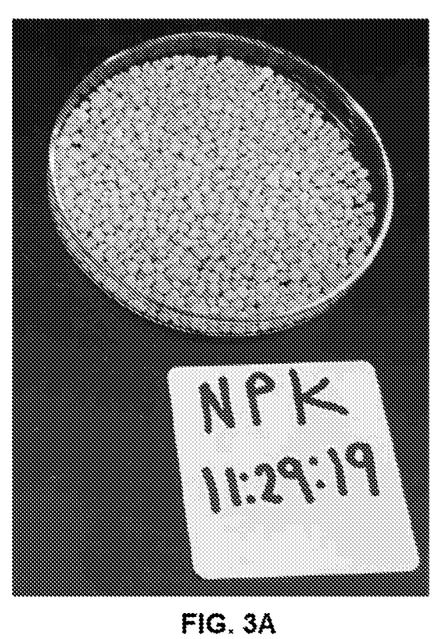
FIGS. 3A-3D are images for non-acidic solid NPK fertilizer granules (FIG. 3A), solid acidic fertilizer granules of the present invention (FIG. 3B), a solution of the non-acidic solid NPK fertilizer dissolved in farm water (FIG. 3C), and a solution of the solid acidic fertilizer granules dissolved in farm water (FIG. 3D).
Figure 3B:
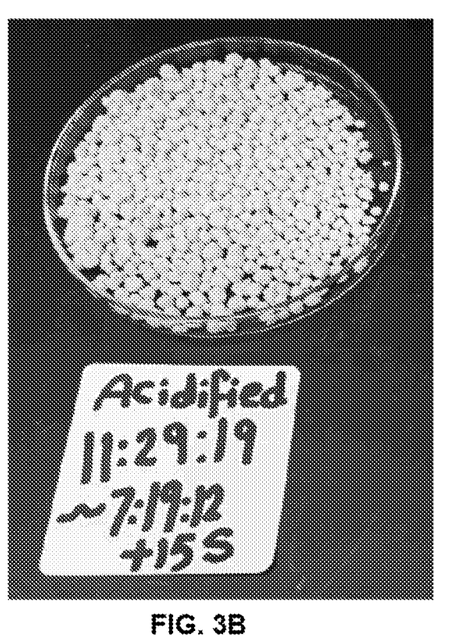

Described below are non-limiting examples of production of solid acidic fertilizer granules. The solid acidic fertilizer granules used in the experiments in Example 2 were made from $NH_3$, phosphoric acid (to provide $P_2O_5$), and $K_2SO_4$ (to provide $K_2O$) in a lab scale stirred tank reactor for testing. Readily made fertilizer granules (non-acidic) (SABIC, Saudi Arabia) that did not contain any filler having an N:P:K:S weight ratio of 11:29:19:6.8 (11:29:19+6.8S grade), as shown in FIG. 3A, were ground into fine powder. The fertilizer powder was then mixed and reacted with a predetermined amount (e.g., 1-10 wt. %) of 98 wt. % concentration sulfuric acid solution to form a paste that has a pH value sufficient for granulation operations. The paste was then transferred into a pan granulator, where additional water and/or sulfuric acid can be added by spraying to adjust pH for desired granulation, to produce granules. The granules were then dried in an open tray to atmospheric dryness and screened for 2-4 mm sized granules. As shown in FIG. 3B, the final solid acidic fertilizer granules had a N:P:K:S weight ratio of about 7:19:12:15 (7:19:12+15S grade).

Example 2

(Characterization of the Solid Acidic Fertilizer)

The solid acidic fertilizers produced by the method of Example 1 were tested for solubility and calcium precipitation and compared to conventional (non-acidic) NPKS (NPK+S) fertilizer granules used to make the solid acidic fertilizers. It was determined that the solid acidic fertilizer granules were more soluble and precipitated less calcium than the conventional NPK+S fertilizer.

Figure 3C:
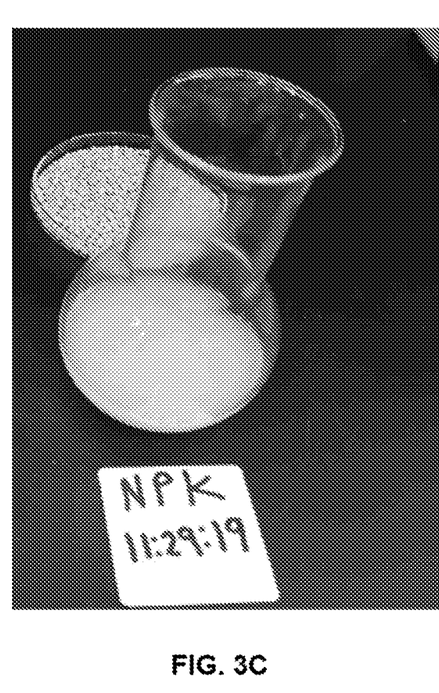
Figure 3D:
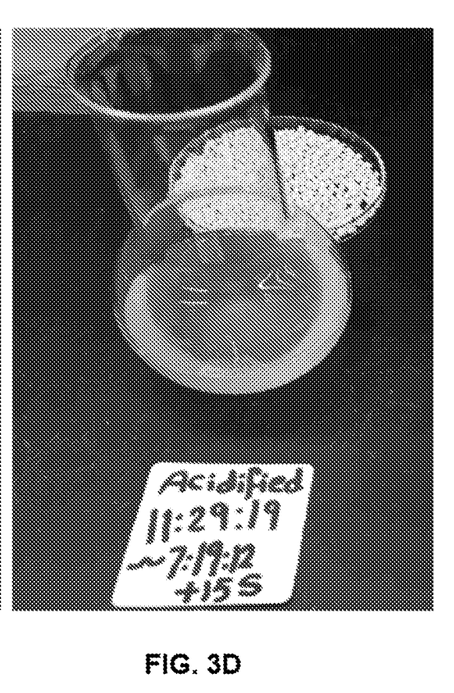

Briefly, the conventional NPK+S fertilizer granules (non-acidic; N:P:K:S weight ratio 11:29:19:6.8 (11:29:19+6.8S grade) or the solid acidic fertilizers of Example 1 (acidic, N:P:K:S weight ratio of about 7:19:12:15 (7:19:12+15S grade) were mixed with farm water (pH=7.8, electrolytic conductivity of about 3.0) that had a high calcium content ($Ca^2$) of about 420 ppm. The phosphate in the conventional NPK+S fertilizer immediately reacted with the calcium and form insoluble calcium phosphate complex that precipitated in the water, as shown by the foggy liquid in FIG. 3C. If the water with the precipitate was used in fertigation, it could quickly clog irrigation system when it accumulates on the irrigation network nozzles. In contrast, when the solid acidic fertilizer granules were mixed in the same amount of the farm water, as shown in FIG. 3D, the resulting fertigation solution was relatively clear and contained less precipitate. Thus, the solid acidic fertilizer reduced the risk of clogging the irrigation system.

Example 3

(Production of Acidic Fertilizer Granules with Various Compositions)

The acidic fertilizer granules can be produced by any means known in the art. A non-limiting example includes, reacting phosphoric acid with ammonia in a reaction unit to form a paste of nitrogen-phosphorus. Potassium and/or other additional additives can be then added to the nitrogen-phosphorus paste. The additional additives can include a secondary nutrient, one or more trace elements, one or more anticaking agents, water, one or more pigments, or a combination thereof. Subsequently, the paste can be transferred to a granulation unit (e.g., granulation drum) to produce the solid fertilizer granules. The inorganic acid can be added in the reaction unit before, after and/or during the reaction between phosphoric acid and ammonia. The inorganic acid can also be added in the granulation unit before, after, and/or during the granulation of the paste. The inorganic acid added in the reaction unit and/or the granulation unit can be concentrated sulfuric acid solution, preferably 98 wt. % sulfuric acid.

It is contemplated that based on the amounts of the starting ingredients used in the process, the resulting acidic fertilizer granule can have various N:P:K:S (nitrogen:phosphorus:potassium:sulfur) weight ratios (NPKS grades or NPK+S grades). These various N:P:K:S ratios (grades) include, but are not limited to about 7:19:12:15, about 7:19:12:10, about 9:25:7:8, about 10:5:10:10, about 18:18:0:6, about 13:13:13:11, about 10:19:10:10, about 10:10:20:13, about 8:15:8:9, about 11:6:17:12, about 8:8:23:14, about 10:10:10:10, about 8:5:26:15, about 6:16:6:8, about 6:29:6:8, about 10:5:15:12, about 11.5:11.5:11.5:9.8, about 18:9:9:9, about 8:26:8:9, about 12:12:12:10, about 12:30:0:6, about 7:34:0:6, and about 12:12:4:8. The resulting acidic fertilizer can also contain additional micronutrients, secondary nutrients, etc.

In some instances, the solid acidic fertilizer can be produced by adding acid, such as sulfuric acid that adds additional sulfur, to amounts of raw materials for producing fertilizers. It is contemplated that the N:P:K:S weight ratio (NPKS grade or NPK+S grade) (e.g., phosphoric acid, ammonia, potash, and/or sulfuric acid) of the starting material used to produce the solid acidic fertilizer by this method can include: 11:29:19:0, 11:29:19:6.8, 11:29:19:7, 14:38:10:3.6, 16:8:16:5.8, 28:28:0:0, 20:20:20:7.2, 15:30:15:5.4, 15:15:30:10.8, 12:24:12:4.3, 17:10:27:9.7, 12:12:36:13, 15:15:15:5.4, 13:5:40:14.4, 10:25:10:3.6, 10:45:10:3.6, 16:8:24:8.6, 18:18:18:6.5, 28:14:14:5, 13:40:13:4.7, 19:19:19:6.8, 18:46:0:0 (grade of DAP), 11:52:0 (grade of MAP), or 18:18:5:1.8, respectively. If inorganic acids are added that do not provide additional nitrogen, phosphorus, potassium, or sulfur, the resulting N:P:K:S weight ratio in the fertilizer will be similar to or the same as the ratio of the starting materials (e.g., use of 11:29:19:6.8 N:P:K:S ratio starting material can produce an acidic fertilizer with a 11:29:19:6.8 N:P:K:S ratio).

Example 4

(Example Acidic Fertilizer Granule Composition)

Solid acidic fertilizer granules were made using a slurry granulation method. A blend containing potassium sulfate and ammonium sulfate, was fed to a granulator. A slurry was prepared by reacting ammonia and phosphoric acid in a pipe cross reactor. Concentrated sulfuric acid (98 wt. %) and the slurry was added to the blend in the granulator and the blend was granulated to form wet acidic fertilizer granules. The sulfuric acid was added at a rate 145 kg/Mt. During the addition of the sulfuric acid and the slurry, the slurry pH was reduced to less than 4. The wet acidic fertilizer granules were sent to a dryer and were dried to form solid acidic fertilizer granules. The solid acidic fertilizer had a N:P:K:S weight ratio of 7:19:11:15

TABLE 1

Materials used per ton of fertilizer granules produced

| Material | Ton/Ton |
| --- | --- |
| Phosphoric acid | 0.360 |
|  | ($P_2O_5$ 54%) |
| Sulfuric acid | 0.145 |
| Potassium sulfate | 0.220 |
| Ammonia | 0.02 |
| Ammonium sulfate | 0.290 |

The invention claimed is:
1. A method of fertigation, the method comprising:
combining a solid acidic fertilizer granule with water to form a fertigation solution having a pH less than 4, the solid acidic fertilizer granule comprising:
a plant nutrient comprising phosphorus, and
an inorganic acid that is distributed throughout the solid acidic fertilizer granule;
applying the fertigation solution or a fertigation solution diluted in additional water to a crop, wherein:

i) the solid acidic fertilizer granule comprises i) ammonium sulfate and ii) potassium sulfate and/or potassium chloride; and/or ii) pH of the solid acidic fertilizer granule is sufficient to form an aqueous solution having a pH of less than 4 when at most 10 grams of the solid acidic fertilizer granule is dissolved in at least 100 ml of water having a pH of greater than 7 before the solid acidic fertilizer granule is dissolved in the water having a pH of greater than 7.

2. The method of claim 1, wherein combining the solid acidic fertilizer granule to the water decreases the pH of the water from a pH of 4 or greater to a pH of less than 4.

3. The method of claim 1, wherein the solid acidic fertilizer granule further comprises nitrogen and/or potassium.

4. The method of claim 3, wherein the plant nutrient comprising phosphorus comprises a compound or salt that comprises phosphorus and one or more of nitrogen and/or potassium.

5. The method of claim 1, wherein the inorganic acid comprises sulfuric acid, hydrochloric acid, phosphoric acid, and/or nitric acid.

6. The method of claim 1, wherein the water combined with the solid acidic fertilizer granule comprises at least 50 ppm calcium ($Ca^{2+}$).

7. The method of claim 6, wherein the inorganic acid prevents formation of calcium phosphate from the phosphorus in the plant nutrient and the calcium in the water combined with the solid acidic fertilizer granule.

8. The method of claim 1, wherein the solid acidic fertilizer granule comprises 4 wt. % or more of the inorganic acid by weight of the solid acidic fertilizer granule.

9. The method of claim 1, wherein the solid acidic fertilizer granule comprises 2 wt. % to 40 wt. % or more of the inorganic acid by weight of the solid acidic fertilizer granule.

10. The method of claim 1, wherein the solid acidic fertilizer granule comprises 10 wt. % or more of the inorganic acid by weight of the solid acidic fertilizer granule.

11. The method of claim 1, wherein the inorganic acid comprises sulfuric acid and/or nitric acid.

12. The method of claim 1, wherein the inorganic acid comprises sulfuric acid.

13. The method of claim 1, wherein the solid acidic fertilizer granule further comprises a secondary nutrient and/or a trace element.

14. The method of claim 1, wherein the solid acidic fertilizer granule has a nitrogen:phosphorous:potassium:sulfur (N:P:K:S) weight ratio of 6 to 8 N:5 to 19 P:5 to 26 K:8 to 15 S.

15. The method of claim 1, wherein the solid acidic fertilizer granule has a nitrogen:phosphorous:potassium:sulfur (N:P:K:S) weight ratio of 6 to 8 N:26 to 34 P:0 to 8 K:6 to 9 S.

16. The method of claim 1, wherein the solid acidic fertilizer granule has a nitrogen:phosphorous:potassium:sulfur (N:P:K:S) weight ratio of 9 to 11.5 N:5 to 25 P:7 to 20 K:8 to 13 S.

17. The method of claim 1, wherein the solid acidic fertilizer granule has a nitrogen:phosphorous:potassium:sulfur (N:P:K:S) weight ratio of 12 to 13 N:12 to 30 P:0 to 13 K:6 to 11 S.

18. The method of claim 1, wherein the solid acidic fertilizer granule has a nitrogen:phosphorous:potassium:sulfur (N:P:K:S) weight ratio of 17 to 19 N:9 to 18 P:0 to 9 K:6 to 9 S.

19. A method of fertigation, the method comprising:
combining a solid acidic fertilizer granule with water to form a fertigation solution having a pH less than 4, the solid acidic fertilizer granule comprising:
a plant nutrient comprising phosphorus, and
an inorganic acid that is distributed throughout the solid acidic fertilizer granule;
applying the fertigation solution or a fertigation solution diluted in additional water to a crop, wherein:
i) the solid acidic fertilizer granule comprises 4 wt. % or more of the inorganic acid by weight of the solid acidic fertilizer granule; and/or
ii) the inorganic acid comprises sulfuric acid and/or nitric acid.

20. A method of fertigation, the method comprising:
combining a solid acidic fertilizer granule with water to form a fertigation solution having a pH less than 4, the solid acidic fertilizer granule comprising:
a plant nutrient comprising phosphorus, and
an inorganic acid that is distributed throughout the solid acidic fertilizer granule;
applying the fertigation solution or a fertigation solution diluted in additional water to a crop, wherein:
i) the solid acidic fertilizer granule has a nitrogen:phosphorous:potassium:sulfur (N:P:K:S) weight ratio of 6 to 8 N:5 to 19 P:5 to 26 K:8 to 15 S;
ii) the solid acidic fertilizer granule has a nitrogen:phosphorous:potassium:sulfur (N:P:K:S) weight ratio of 6 to 8 N:26 to 34 P:0 to 8 K:6 to 9 S;
iii) the solid acidic fertilizer granule has a nitrogen:phosphorous:potassium:sulfur (N:P:K:S) weight ratio of 9 to 11.5 N:5 to 25 P:7 to 20 K:8 to 13 S;
iv) the solid acidic fertilizer granule has a nitrogen:phosphorous:potassium:sulfur (N:P:K:S) weight ratio of 12 to 13 N:12 to 30 P:0 to 13 K:6 to 11 S; and/or
v) the solid acidic fertilizer granule has a nitrogen:phosphorous:potassium:sulfur (N:P:K:S) weight ratio of 17 to 19 N:9 to 18 P:0 to 9 K:6 to 9 S.

* * * * *